Figure 1:
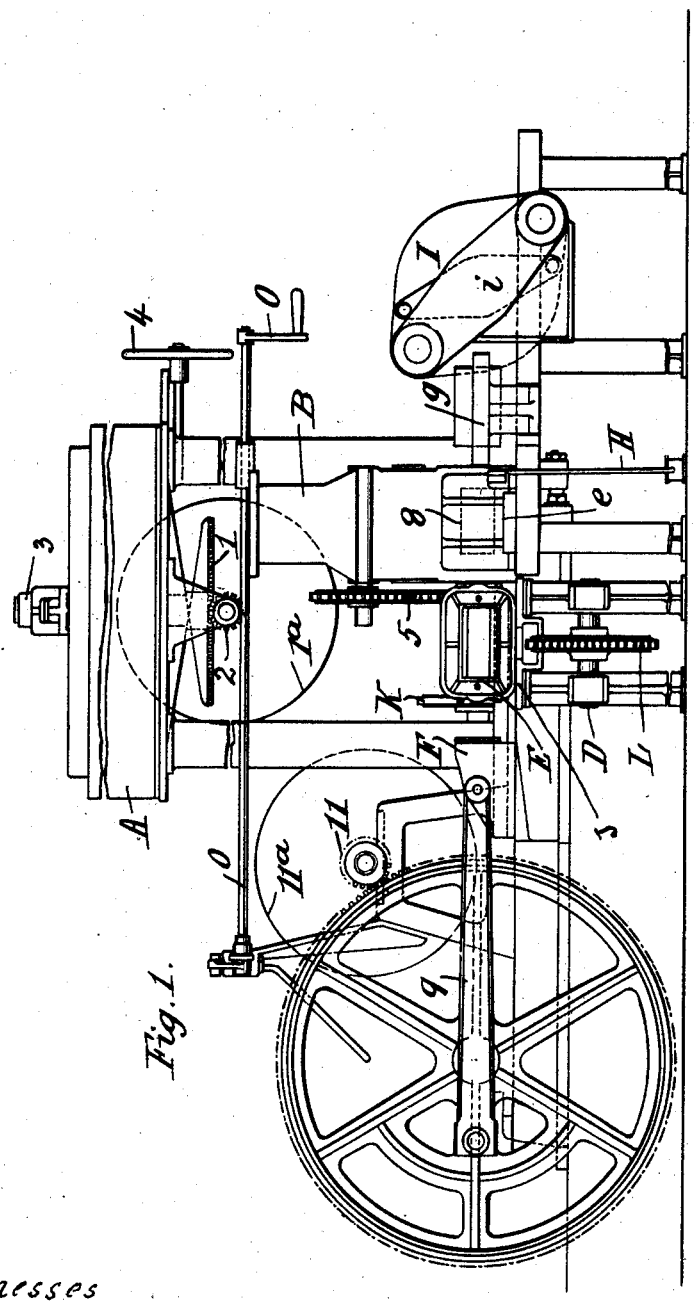

C. M. C. HUGHES, T. H. QUINLAN & R. MIDDLETON.
MACHINE FOR MAKING BLOCKS, PLATES, &c., FROM PLASTIC MATERIALS.
APPLICATION FILED OCT. 15, 1906.

901,296.

Patented Oct. 13, 1908.

6 SHEETS—SHEET 1.

Witnesses
James G. Linton
H.C. Elliott

Inventors
C.M.C. Hughes
T.H. Quinlan
R. Middleton
by their Attorney
Bernhart Jusses

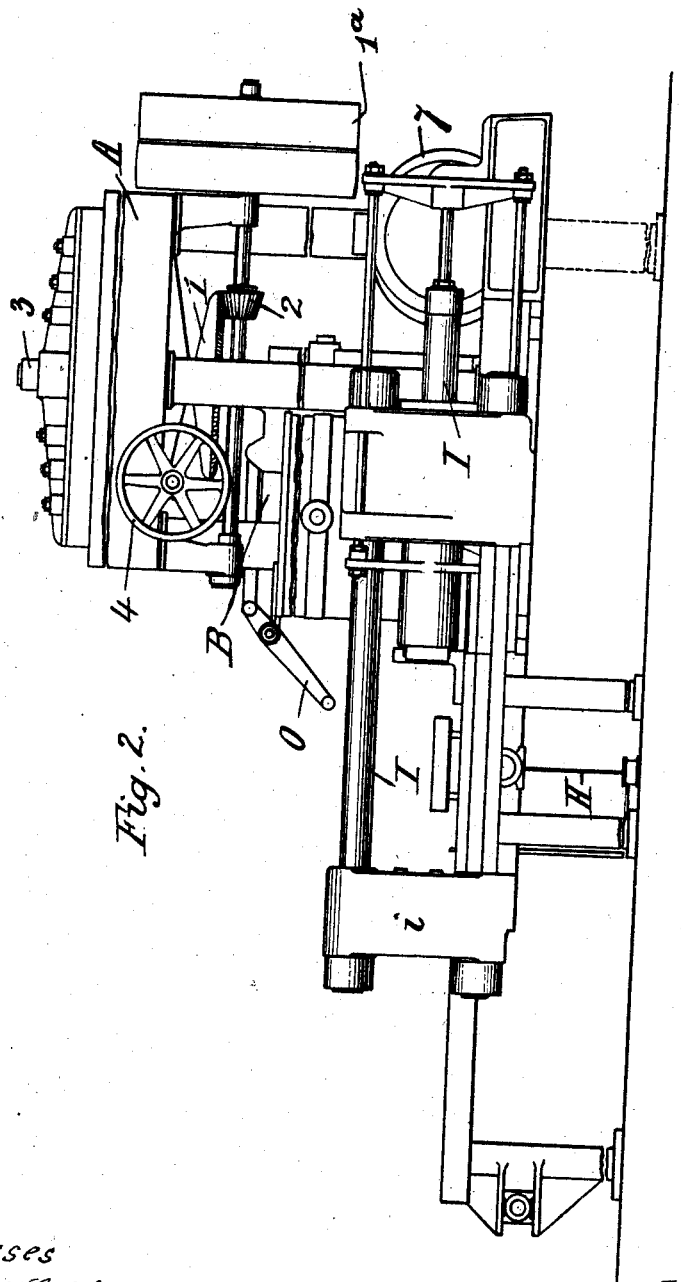

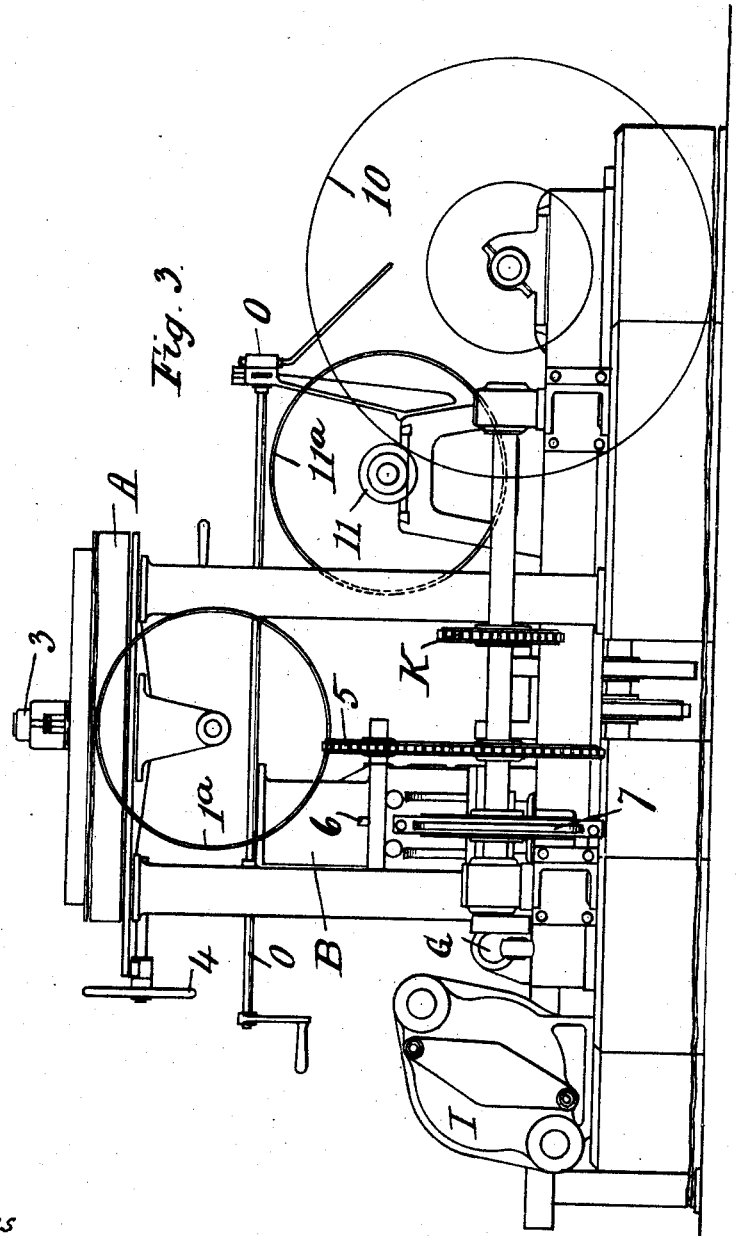

C. M. C. HUGHES, T. H. QUINLAN & R. MIDDLETON.
MACHINE FOR MAKING BLOCKS, PLATES, &c., FROM PLASTIC MATERIALS.
APPLICATION FILED OCT. 15, 1906.
901,296.
Patented Oct. 13, 1908.
6 SHEETS—SHEET 4.
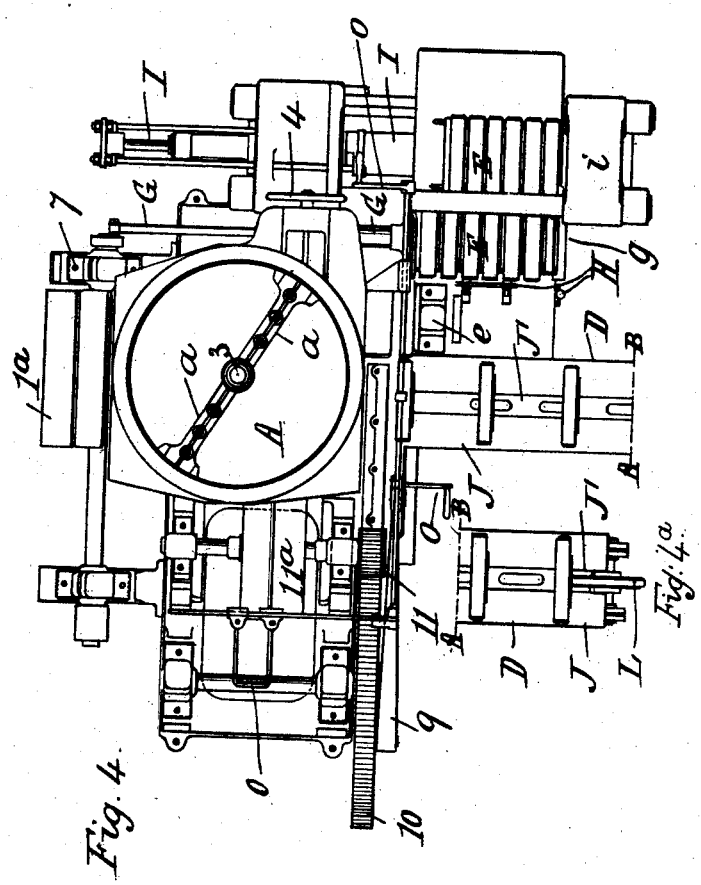
Witnesses
Inventors
C. M. C. Hughes
T. H. Quinlan
R. Middleton
by their Attorney

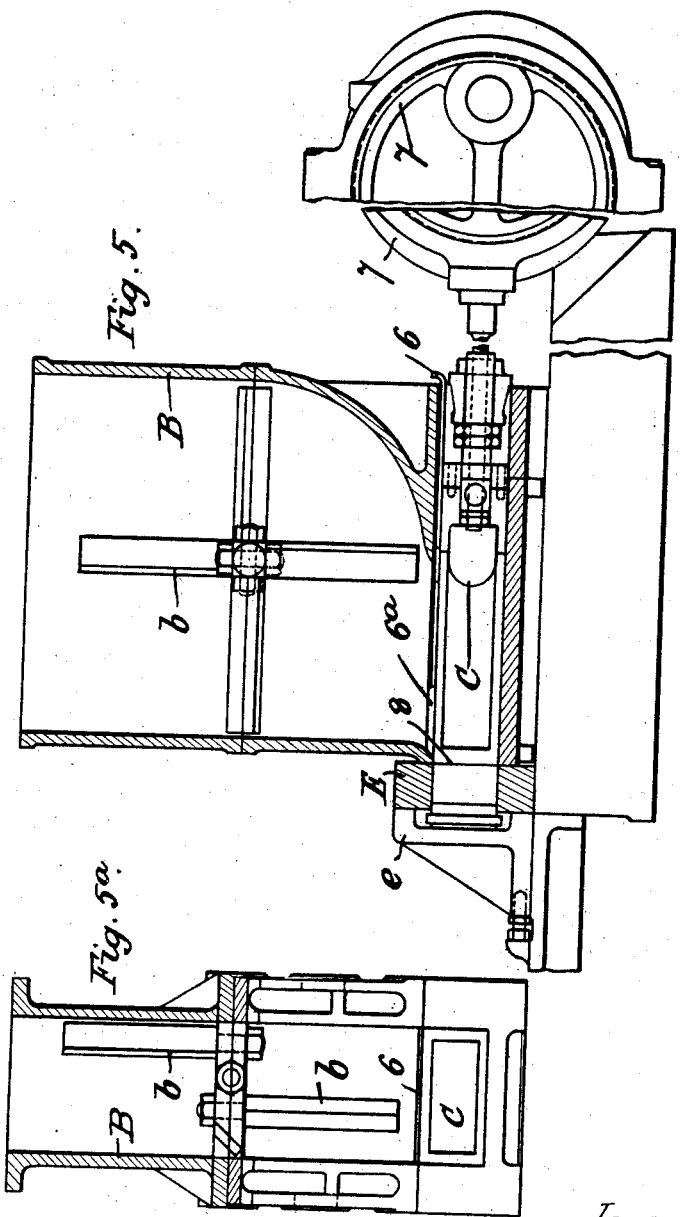

C. M. C. HUGHES, T. H. QUINLAN & R. MIDDLETON.
MACHINE FOR MAKING BLOCKS, PLATES, &c., FROM PLASTIC MATERIALS.
APPLICATION FILED OCT. 15, 1906.
901,296.
Patented Oct. 13, 1908.
6 SHEETS—SHEET 6.
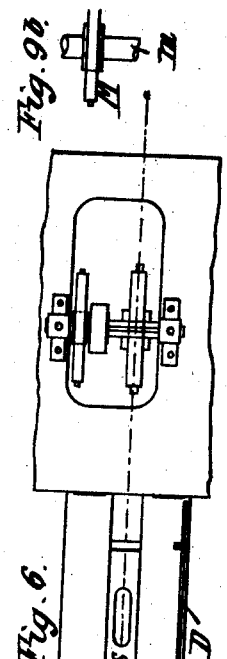
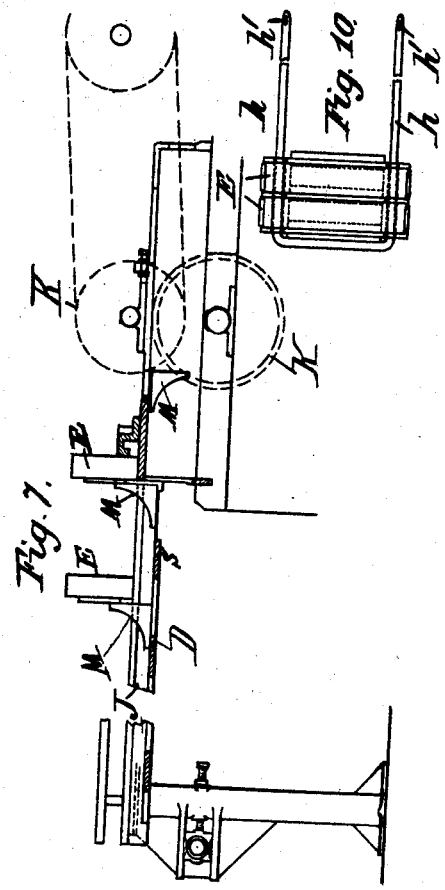
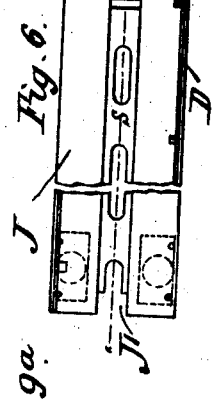
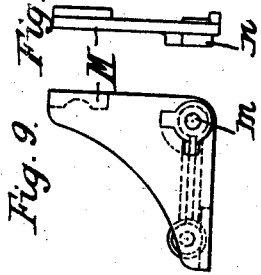
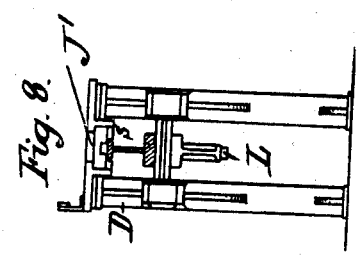
Witnesses:
Inventors
C. M. C. Hughes
T. H. Quinlan
R. Middleton
by their Attorney

UNITED STATES PATENT OFFICE.

CHARLES MORLAND CUNYNGHAME HUGHES AND THOMAS HENRY QUINLAN, OF LONDON, AND ROBERT MIDDLETON, OF LEEDS, ENGLAND, ASSIGNORS TO CORK ASPHALT LIMITED, OF LONDON, ENGLAND, A COMPANY OF GREAT BRITAIN.

MACHINE FOR MAKING BLOCKS, PLATES, &c., FROM PLASTIC MATERIALS.

No. 901,296.      Specification of Letters Patent.      Patented Oct. 13, 1908.

Application filed October 15, 1906. Serial No. 339,143.

*To all whom it may concern:*

Be it known that we, CHARLES MORLAND CUNYNGHAME HUGHES, of Blomfield House, London Wall, in the city of London, England, colonial broker, THOMAS HENRY QUINLAN, of 11 Angel Court, in the said city, gentleman, and ROBERT MIDDLETON, of Sheepscar Foundry, Leeds, in the county of York, England, engineer, all subjects of the King of England, have invented a new or Improved Machine for Making Blocks, Plates, or other Articles from Plastic Materials, (for which a patent has been applied for in England, and which application is dated April 2, 1906, No. 7,852,) of which the following is a specification.

In producing blocks, plates and other articles from heated plastic materials it has often been felt that a machine is required which shall permit continuous working and produce goods of uniform quality rapidly and cheaply.

Accordingly, this invention relates to a machine which receives the prepared plastic composition or material, such, say, as a mixture of bitumen with cork and sawdust or the like, in a hopper, thence feeds it to a suitable gate or outlet, fills the molds, then presents the molds to a hydraulic plunger which compresses the contents of the molds and, the molds having been closed under pressure, permits their removal from the machine. Most of these operations this machine effects automatically, so that two or three attendants will suffice to work it, and the whole is simple, strong and durable in construction.

The said machine is represented in the accompanying drawings in which:—

Figure 1 is a front elevation of the whole machine. Fig. 2 is a side elevation of the machine seen from the right hand side of Fig. 1. Fig. 3 is an elevation of the machine seen from the back. Fig. 4 is a plan view of the machine. Fig. 4ª is a continuation of the feed table cut off along line A B of Fig. 4. Fig. 5 is a sectional elevation of the feed chamber under the hopper and Fig. 5ª is a cross section of Fig. 5. Fig. 6 is a plan of the mold conveying mechanism or feed table. Fig. 7 is an elevation of Fig. 6 partly in section. Fig. 8 is an end elevation of Fig. 6 partly in section. Fig. 9 is a side elevation of a carrier or push piece that forms part of the mold conveying mechanism. Fig. 9ª is an end elevation of Fig. 9. Fig. 9ᵇ is a plan view of a portion of a carrier and the spindle upon which it is mounted. Fig. 10 is a plan of two molds slipped on to clamp hereinafter referred to.

The several views are drawn to various scales for the sake of greater clearness. Moreover parts are shown broken away in several figures for convenience in draftsmanship. These matters will however be readily understood and it will be appreciated that the dimensions of the several parts vary with the size of the goods to be produced.

Broadly speaking, the machine consists substantially of the following parts:—There is a hopper A which receives the material to be molded; this is fitted with a stirrer which revolves horizontally. From this hopper the material descends to the chamber B fitted with a stirrer that revolves vertically. It is thence supplied to a feed chamber C in which moves a plunger that forces the material into molds presented by the feed mechanism D. The filled molds are slipped upon a U shaped clamp by a second plunger working parallel with that in the feed chamber and are carried forward to a hydraulic press I compressing the contents of the molds. The closed molds are then removed from the machine.

I will now proceed to describe the several parts of the machine.

The hopper A is seen in Figs. 1 to 4. It is fitted with a horizontal stirrer $a$ (Fig. 4.) This stirrer is driven by a toothed wheel 1, receiving motion from a pinion 2; 3 is the upper bearing for the spindle of such stirrer. 4 is a hand-wheel which operates a slide by means of which the outlet from the hopper A to the chamber B can be regulated or even entirely closed if desired. It will be understood that the slide moves horizontally under the hopper A. The pulley for driving the stirrer is indicated at 1ª.

The chamber B is shown separately and on an enlarged scale in Figs. 5 and 5ª. In this chamber B rotates the stirrer $b$, deriving motion from a chain-wheel, and chain 5 (see Figs. 1 and 3.) As will clearly appear from Fig. 5 the back of chamber B slopes forward towards the discharge opening. 6 is a slide that can be operated by hand and permits the quantity passing to each mold to be regulated. The outlet from chamber B is shown at 6ª Fig. 5, its aperture being reduced to the extreme limit. It is enlarged by pulling slide 6 backwards to the right in Fig. 5. Under the discharge opening 6ª of chamber B works a plunger C operated by an eccentric 7. The to and fro movement of this plunger C forces the material brought down by the rotation of stirrer b, forward and outward to the discharge opening 8 where the molds are presented as will presently be set forth.

The molds E E are placed on the feed table D, by it brought towards the discharge opening 8 so as to face slide F. When each mold is full, the slide F, actuated by the connecting rod 9, pushes it towards the right in Fig. 1, where it is received on a clamp such as shown in Fig. 10, a plunger G serving to force the mold on to the clamp. A toothed wheel 10 serves to actuate the slide F through the connecting rod 9. 11 is the pinion that drives wheel 10, and the pulley 11ª actuates the latter. It has to be observed that the throw of slide F is such that it will just push the mold facing it off the feed D and place it in front of the discharge opening 8, and no further. The mold last pushed off the table serves to receive motion from the one in contact with slide F, and to push the mold that is then in front of the discharge opening 8 further to the right (in Figs. 1 to 4) so as to bring it in face of plunger G. It will be understood that suitable thrust blocks are provided where necessary, thus, e in Figs. 1 and 5 shows the thrust block in front of the discharge opening 8.

At H is shown an hydraulic arrangement which pushes a set of molds E when they have been threaded on the clamp h (Fig. 10) forward to the hydraulic press I, and this hydraulic press forces together the molds to a sufficient extent to permit cotters to be placed into the ends of h, holes h¹ being provided for the reception of the cotters as seen in Fig. 10.

The feed mechanism is more fully illustrated in Figs. 6 to 9. It will be seen to consist of the table J supported on a suitable framework, and having a slot J¹ in the middle. An endless chain moves in that slot J¹ (see Figs. 4 and 4ª). This endless chain L is operated by chain gearing K (see Figs. 1, 6 and 7). The chain L carries pivoted push pieces M M. The push pieces M M have pivots m m; during the forward travel of the chain the push pieces remain in their raised position, being retained therein by bearing on a sunk surface s of the table by means of projections n. When, however, they reach such position as to have brought the molds in line with the slide F, they reach a gap in the surface s, are permitted to drop, and then pass below the line on which they engage with the molds. This will be clear on comparing Figs. 1, 4, and 6 to 9 inclusive. The table is supplied with molds by hand from the end farthest away from the face of the machine, that is to say that portion that is shown in Fig. 4ª, which is, of course, a continuation of Fig. 4, as already hereinabove pointed out.

At O is shown belt-shifting gear of the usual construction.

The operation of the machine will therefore be as follows:—The plastic material is fed into the hopper A, there stirred up by the stirrer a. At that time the slide operated by hand-wheel 4 may conveniently be closed. When the material has thoroughly been stirred up, the slide is opened and the material passes to chamber B where it is further stirred by stirrer b and fed forward to the aperture 8. Meanwhile molds have been placed on table D and the revolution of the various pulleys and chainwheels has caused the plunger C to be drawn back to the extreme end of its stroke, and one of the molds E to be brought to the discharge opening 8. Then the plunger C begins to move forward and fills the mold. During this time the slide F has come into position to push off another mold from the table, thereby forcing the filled mold E away from the discharge opening (replacing it by another) and the full mold is brought in front of plunger G. One of the clamps h being placed on the thrust block g will be ready to receive the full mold E when the plunger G advances. This operation is repeated until the full number of molds has been threaded on to the clamp in front of plunger G. Power is put on to the hydraulic arrangement H and the set of molds on the clamp is pushed forward another step until it exactly faces the plunger of the hydraulic press I for which i is the thrust block. Power is now admitted to the hydraulic press I, upon the plunger on which the closing plate of the nest or series rests and the molds are closed up on the clamp h until it is possible to insert the cotters in the eyes or holes h¹ of the clamps h. The cotters are then inserted and the set is removed until such time as the blocks in the molds have had thorough time to set. Then the operation continues.

Claims.

1. In a machine for making blocks or other articles from plastic materials the combination of a hopper, a mixing chamber, a mold filling plunger, molds, transverse mold shifting mechanism, and an endless chain mechanism for supplying the molds, with means for moving the molds from the mold filling aperture to a mold clamping arrangement.

2. In a machine for making blocks, plates or other articles from plastic materials, a mold clamping mechanism, consisting of a reciprocating plunger and a thrust block adapted to receive a mold clamp.

3. In a machine for making blocks, plates or other articles from plastic materials the combination of a hopper, a mixing chamber a mold filling plunger transverse chain operated mold shifting mechanism, a mold clamping plunger arrangement and hydraulic mechanism for transversely shifting a set of molds.

4. In a machine for making blocks, plates or other articles from plastic materials, the combination of a hopper a mixing chamber, mold filling devices, molds, chain operated mold shifting mechanism, mold clamping mechanism and a hydraulic press.

5. In a machine for making blocks, plates or other articles from plastic materials, the combination of a hopper, a mixing chamber mold filling mechanism, chain operated mold shifting mechanism, mold clamping mechanism, means for transferring the molds from the clamping mechanism to a press and mold compressing mechanism.

6. In a machine for making blocks, plates or other articles from plastic materials, a mold filling mechanism consisting of a slotted table and endless chain in the table slot, push pieces on the chain and a reciprocating slide in conjunction therewith.

7. In a machine for making blocks, plates or other articles from plastic materials a mold feeding mechanism consisting of a slotted table an endless chain working in said table, mold pushing devices on the endless chain and a transverse crank operated slide at the end of the feed table.

In testimony whereof we have hereunto set our hands in the presence of two witnesses.

CHARLES MORLAND CUNYNGHAME HUGHES,
THOMAS HENRY QUINLAN,
ROBERT MIDDLETON.

Witnesses:
G. F. WARREN,
BERNHARD DUKES.